June 18, 1940.  A. L. JOHNSON  2,204,893
EMERGENCY BRAKE LEVER ASSEMBLY
Filed Jan. 28, 1939
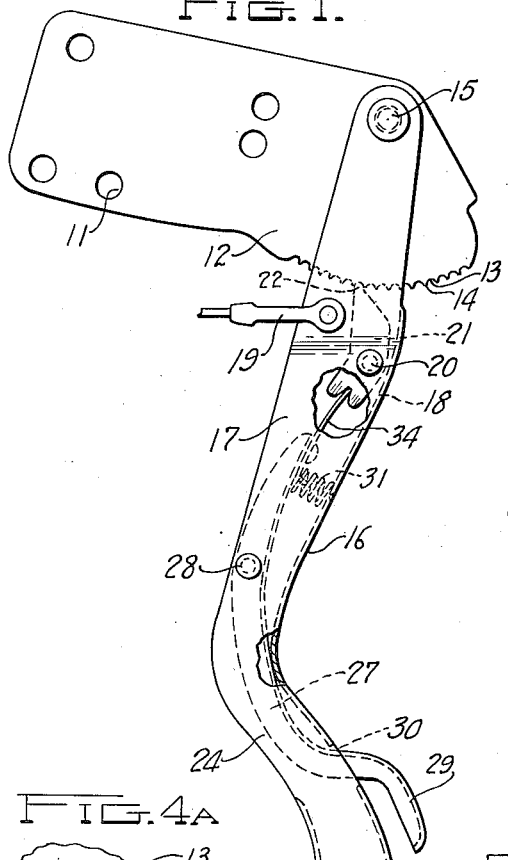
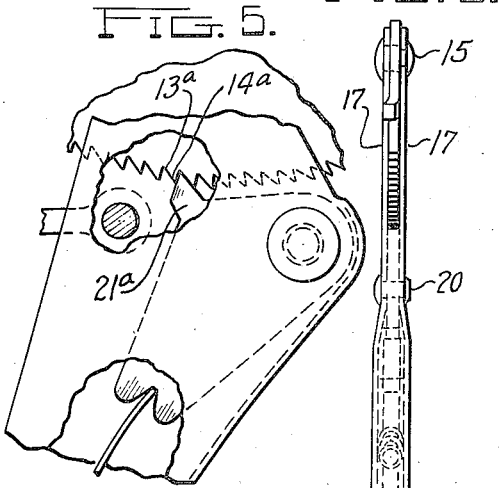
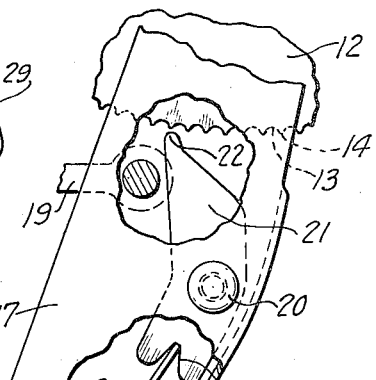
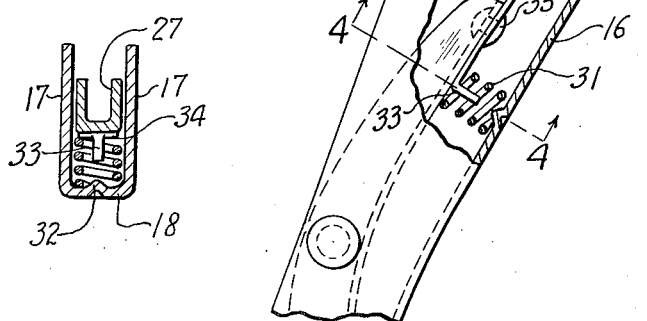
Alvin L. Johnson
INVENTOR
BY Malcolm W. Fraser
ATTORNEY Patented June 18, 1940

2,204,893

UNITED STATES PATENT OFFICE 2,204,893

EMERGENCY BRAKE LEVER ASSEMBLY

Alvin L. Johnson, Ottawa Hills, Ohio, assignor to The American Forging & Socket Company, Pontiac, Mich., a corporation of Michigan Application January 28, 1939, Serial No. 253,295

2 Claims. (Cl. 74—537)

This invention relates to motor vehicles but more particularly to emergency brake levers therefor.

An object is to produce an efficient brake lever for automobiles which is easy to operate, simple in construction, and inexpensive to manufacture.

Another object is to produce a hand brake lever assembly which can be readily disengaged from its sector by a very slight movement thereby facilitating release of the brake and obviating the necessity of manually exerting an excessive amount of effort to effect such release.

A further object is to produce a new and improved hand emergency brake lever provided with a so-called "delayed action" whereby depression of the usual spoon does not retract or render ineffective the locking member until slight movement has first been imparted to the lever in a brake-tightening direction, thereby eliminating the danger of accidental release of the brake.

Further objects of the invention reside in details of construction, assembly and operation hereinafter more fully described.

For purposes of illustration but not of limitation, an embodiment of the invention is shown in the accompanying drawing in which Figure 1 is a side elevation partly in section of a hand emergency brake lever assembly for an automobile;

Figure 2 is a side edge elevation of the assembly shown in Figure 1;

Figure 3 is an enlarged fragmentary side view of the lever and sector, some parts being broken away to show parts more clearly;

Figure 4 is a transverse sectional view on the line 4—4 of Figure 3; and

Figure 5 is an enlarged fragmentary view of a lever showing an alternate form of pawl and ratchet structure.

The illustrated embodiment of the invention comprises a hand emergency brake lever assembly for automobiles and, as shown, a sheet metal mounting plate 10 is formed with holes 11 to receive bolts for securing the plate to a suitable support, such as a support disposed underneath the instrument board of the car. Forming an integral part of the mounting plate 10 is a sector 12 formed with an arcuate series of relatively shallow grooves 13 alternating with relatively short rounded teeth 14. As more clearly shown on Figure 3, the shallow grooves 13 are rounded and the teeth 14 which are relatively narrow are each disposed at approximately right angles to the tangent of the arc defined by such arcuate series.

Pivotally connected by a rivet 15 adjacent the upper end portion of the mounting plate 10 and depending therefrom is a brake lever 16 which is formed of sheet metal and is provided with a pair of laterally spaced integral arms 17, the upper end portions of which straddle the sector 12. The arms are integrally connected by a web 18 which extends from a point beneath the sector 12 to the lower end of the lever. Pivotally connected to the lever 16 and straddling the two arms is a member 19 which provides a connection between the lever and suitable brake-operating means (not shown).

Disposed between the arms 17 and pivotally mounted on a rivet 20 is a metal pawl the upper end of which inclines to the left (Figures 1 and 3), or in a direction toward the member 19. The upper end portion of the panel is pointed and the extreme end or nose 22 of the pawl is rounded in the form of a knob to fit nicely into a groove 13. The lower end portion of the pawl 21 below the rivet 20 forms with the upper end portion a substantially obtuse angle and the extreme lower end is formed with a substantially V-shaped notch 23. It will be observed that the rivet 20 on which the pawl 21 is pivoted is juxtaposed to the web portion 18 of the lever.

It will be noted that the lower end portion of the lever 16 inclines forwardly as indicated at 24 and the portion of the lever therebeneath, designated by the numeral 25, which provides the hand grip curves downwardly and rearwardly, the metal on the inner side being flanged over as indicated at 26 to provide a comfortable hand hold. Disposed between the arms 17 of the lever is a pawl actuating arm 27 which is pivoted on a rivet 28 disposed above the bend of the lever and in a position juxtaposed to the free edges of the arms 17 opposite to the web portion 18. The actuating arm 27 is somewhat C shaped and is formed with a reversely bent lower end 29 providing a thumb-engaging portion which extends through an opening 30 in the wall of the web 18. The arm 27 which is of sheet metal is of U shape in cross section, as shown on Figure 5, and is normally urged in a counterclockwise direction (Figure 1) by a helical spring 31. The lower end of the spring 31 seats on a knob 32 pressed out of the web 18 and the opposite end exerts pressure against the upper end portion of the arm 27, such end fitting over an outwardly turned extension 33 on a spring finger 34. The finger 34 consists of a strip of spring tempered metal which is secured by a rivet 35 intermediate its ends to the upper end portion of the actuating arm 27.

The upper end of the spring finger 34 seats in the inner end of the V-shaped notch 23 of the pawl 21.

In operation, it will be understood that with the parts in the position shown on Figure 1, the nose of the pawl 21 is in engagement with one of the grooves 13. The lever 16 is held by the brake setting stress and movement of the lever to the left of the figure can not be accomplished until the pawl is released from the ratchet. Such release can not be accomplished merely by depressing the thumb piece 29 of the pawl actuating arm 27. However, depression of the thumb piece 29 exerts a resilient force against the pawl which tends to rock it in a counterclockwise direction away from the ratchet teeth. The spring finger 34 alone is not sufficient to accomplish such pawl movement, but upon slight movement of the lever 16 to the right an amount sufficient to enable the rounded end 22 of the pawl to swing clear of the teeth, the lever is freed from the ratchet. Thus it will be apparent that since the teeth 14 are quite short a very slight movement of the lever 16 is adequate to release the stress upon the pawl which is quickly and abruptly moved away from the teeth by means of the spring finger 34. Thereupon the lever 16 can be moved freely in either direction so that the brake can be applied and released readily at will. Upon release of the pawl actuating arm 27 the coil spring 31 operates to rock the pawl 21 through the agency of the arm 27 and finger 34 in a clockwise direction into engagement with one of the notches 13 on the sector.

An important feature resides in the construction of the ratchet and pawl in such manner that a very slight pull on the lever is adequate to release the pawl but when the pawl is in brake setting position, the parts are securely and rigidly retained in place, the force of the pawl being directed in such manner that substantial metal in the sector sustains the load imposed upon it. It will be observed that the force of the pawl is transmitted to substantially the center of the groove with which it engages, so that the possibility of shearing teeth in the ratchet or the pawl is eliminated. This dispenses with the use of a sizable tooth on the sector which heretofore has been sheared when an excessive strain is imposed upon it.

Another feature of outstanding importance is that release of the brake can be effected only after positive movement is imparted to the lever. As heretofore brought out, depression of the pawl actuating arm is not sufficient to effect brake release so that accidental hitting of the lever will not release the brake. On the contrary, a movement of the lever which is indeed a slight one but nevertheless a positive one, in a brake tightening direction, must be first made before the pawl can possibly be disengaged from the ratchet.

An alternate form is shown on Figure 5 in which the teeth 14a of the sector are of the usual type, tapering to a point and providing substantially V-shaped angularly disposed notches 13a therebetween. In this instance, the extreme end of the pawl 21a is pointed as indicated at 22a to fit into one of the notches 13a. In this form it will be apparent that a greater movement in brake applying direction must be imparted to the lever 16 before the pawl 21a can rock free of the ratchet teeth.

It will be apparent that the above construction is exceedingly simple and relatively inexpensive to manufacture. The arrangement enables the brake to be applied to the required degree and held in precisely the position in which it is set. Particularly in the form shown in Figures 1 to 4, an exceedingly slight movement in a brake applying direction is required to release the pawl whereupon the lever can move freely so long as the pawl actuating arm is depressed. Upon release of the pawl actuating arm the pawl immediately finds its notch whereupon it is held securely in place.

It is to be understood that numerous changes in details of construction, arrangement and operation may be effected without departing from the spirit of the invention especially as defined in the appended claims.

What I claim is:

1. A brake lever assembly comprising a sector provided with a ratchet having an arcuate series of alternating notches and teeth, a brake lever pivotally connected at one end to said sector and movable across said ratchet, a pawl pivoted intermediate its ends to said lever and having one end engageable with said ratchet, a pawl actuating trip lever pivoted intermediate its ends to said brake lever, a laterally flexible resilient arm carried by said trip lever, forming a continuation thereof and articulated to the pawl to exert yieldable rocking effort thereupon when the trip lever is actuated, and spring means urging said arm in a direction to rock said pawl into engagement with said ratchet.

2. A brake lever assembly comprising a ratchet plate having substantially segmentally arranged teeth, a brake lever fulcrumed on the plate substantially at the center of the segment, whereby the lever projects substantially radially from the ratchet plate, a pawl pivoted on the brake lever adjacent the teeth and having a working arm engageable with the teeth and which, when in engagement with the teeth, extends substantially parallel to the ideal arm of the lever but is swingable away from such engagement, a trip lever for actuating the pawl to released position pivoted on the brake lever and extending substantially parallel thereto and articulated to the pawl, a laterally flexible spring section forming a portion of said trip lever and yieldable in the direction in which effort is applied to the latter to release the pawl, whereby said trip lever may be actuated whether or not the pawl is movable to released position, said teeth being defined by relatively shallow depressions having rounded bottoms, within which depressions the end of said working arm of the pawl is engageable, spring means tending to rock the pawl in a direction to urge said end of the pawl against the bottom of whichever of said depressions is operatively adjacent the same, said teeth being of sufficient height to trap said end of the pawl and prevent movement thereof in either direction until said brake lever is moved bodily in a direction to rock the pawl toward released position sufficiently to free the same for full movement to released position under the influence of the energy stored in said spring section.

ALVIN L. JOHNSON.